US 6,691,602 B1

(12) United States Patent  
Harth et al.

(10) Patent No.: US 6,691,602 B1
(45) Date of Patent: Feb. 17, 2004

(54) REACTION FORCE TRANSMISSION MECHANISM FOR A PNEUMATIC BRAKE BOOSTER

(75) Inventors: Ralf Harth, Darmstadt (DE); Holger von Hayn, Bad Vilbel (DE); Jürgen Schonlau, Walluf (DE); Wolfgang Ritter, Oberursel/Ts. (DE); Steffen Linkenbach, Eschborn (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 12 days.

(21) Appl. No.: 10/070,270
(22) PCT Filed: Jul. 12, 2000
(86) PCT No.: PCT/EP00/06641
§ 371 (c)(1),
(2), (4) Date: Mar. 1, 2002
(87) PCT Pub. No.: WO01/15952
PCT Pub. Date: Mar. 8, 2001

(30) Foreign Application Priority Data

Sep. 1, 1999 (DE) .......................................... 199 41 466

(51) Int. Cl.⁷ ................................................. F15B 9/10
(52) U.S. Cl. ................................................... 91/369.2
(58) Field of Search ....................................... 91/369.2

(56) References Cited

U.S. PATENT DOCUMENTS 3,548,595 A * 12/1970 Pech et al. .................. 91/369.3
4,354,353 A * 10/1982 Laue .......................... 91/369.2
5,054,370 A    10/1991 Osterday et al. ........... 91/369.2

FOREIGN PATENT DOCUMENTS

| DE | 16 55 429 | 11/1971 |
| DE | 3709172 | 9/1988 |
| DE | 40 20 904 | 1/1992 |
| DE | 197 55 442 | 6/1999 |
| WO | 9926826 | 6/1999 |

OTHER PUBLICATIONS

Patent Abstracts of Japan, publication No. 09169262A, Jun. 30, 1997, 'Atmospheric Pressure Type Booster'.
Patents Abstracts of Japan, publication No.59–195460 (A), Nov. 6, 1984, M–364 Mar. 16, 1985 vol. 9/No. 60 'Suction Pressure Servo Unit'.

* cited by examiner

Primary Examiner—F. Daniel Lopez
(74) Attorney, Agent, or Firm—Rader, Fishman & Grauer PLLC

(57) ABSTRACT

The present invention relates to a reaction force transmission mechanism for a pneumatic brake booster including a largely incompressible reaction plate that is interposed between an input member and an output member and encased at the peripheral side and has lateral abutment surfaces for the input member and the output member, wherein the abutment surface close to the input member can be acted upon by a pressure member which is adapted to be fixed to a control housing and, consequently, can be excepted from the transmission of the reaction force to a vehicle driver. To improve its service life, the reaction plate includes a recess in the area of the abutment of a valve piston extension, in which recess a substantially incompressible, elastic insert is placed.

7 Claims, 4 Drawing Sheets

REACTION FORCE TRANSMISSION MECHANISM FOR A PNEUMATIC BRAKE BOOSTER

TECHNICAL FIELD

The present invention relates to a reaction force transmission mechanism for a pneumatic brake booster.

BACKGROUND OF THE INVENTION

Reaction force transmission mechanisms principally comprise reaction plates which, at least at their periphery, are received in a control housing and act under pressure like an incompressible fluid. More specifically, the reaction plate establishes the balance of forces between the foot pressures exerted by the vehicle driver on the brake system and the reaction forces on the part of the brake system. Consequently, the pressure forces applied to the plate are converted into a change in shape with the limiting conditions of a constant volume and a constant pressure in the interior of the plate. A reaction plate of this type is e.g. disclosed in DE 11 92 532 A1 and basically satisfies the demands placed on conventional apparatus.

Recently, however, there is a trend to using brake boosters with transmission mechanisms which provide a panic stop function. These brake boosters are characterized by the fact that a normal brake application or an emergency brake operation with full power boosting is initiated in dependence on a predetermined relative displacement between an input member (valve piston) and a control housing that receives the reaction plate at least in part, which necessitates only low (foot) brake forces in comparison to priorb-art pneumatic-mechanic brake boosters. A brake booster of this type is e.g. disclosed in EP 901 950 A1 and comprises a pressure member which can be fixed to a control housing by way of coupling means. The comfort of actuation is, however, considered worthy of improvement because no counter-forces or only low counterforces, which are not in conformity with the normal reaction force of the brake system, are transmitted to the vehicle driver in the emergency brake position.

From WO99/26826 another brake booster with a panic stop function is known which, as far as the reaction of forces is concerned, offers certain advantages, but nevertheless requires improvements with respect to the useful life of the reaction plate because the front end of the valve piston acts with a comparatively small effective surface on the reaction plate, which causes increased stress.

BRIEF SUMMARY OF THE INVENTION

It has been found that the problems are overcome in that the reaction plate includes a recess in the area of the abutment of the valve piston's extension, and in that a substantially incompressible, elastic insert is placed into the recess. This measure permits reducing stress, in particular shearing strains, in the inside of the reaction plate and, consequently, increases the service life of the reaction plate.

It is advantageous in another embodiment of the present invention that the valve piston's extension is configured as a separate tracer pin, and the diameter of the tracer pin in the area of its abutment on the reaction plate corresponds to the diameter of the recess. Thus, the radial outside part and the insert are separated in the area of the most intense (shearing) strains.

Finally, it is favorable that the insert and the outside part are made of materials with a different elasticity module (or different Shore hardness). This permits adapting the brake force booster with respect to the switch-on threshold of the panic stop function.

Another favorable effect is achieved by that, starting from the abutment surface of the output member (push rod) on the reaction plate side, an axial recess is provided into which the insert is additionally slipped. Thus, the circular-cylindrical insert (in the non-deformed condition) has a length greater than the thickness of the reaction plate. This imparts a greater volume to the insert and allows the insert to transform pressure stress into deformation work to a still greater extent.

DETAILED DESCRIPTION OF PREFERRED EMBODIMENTS

Figure 1:
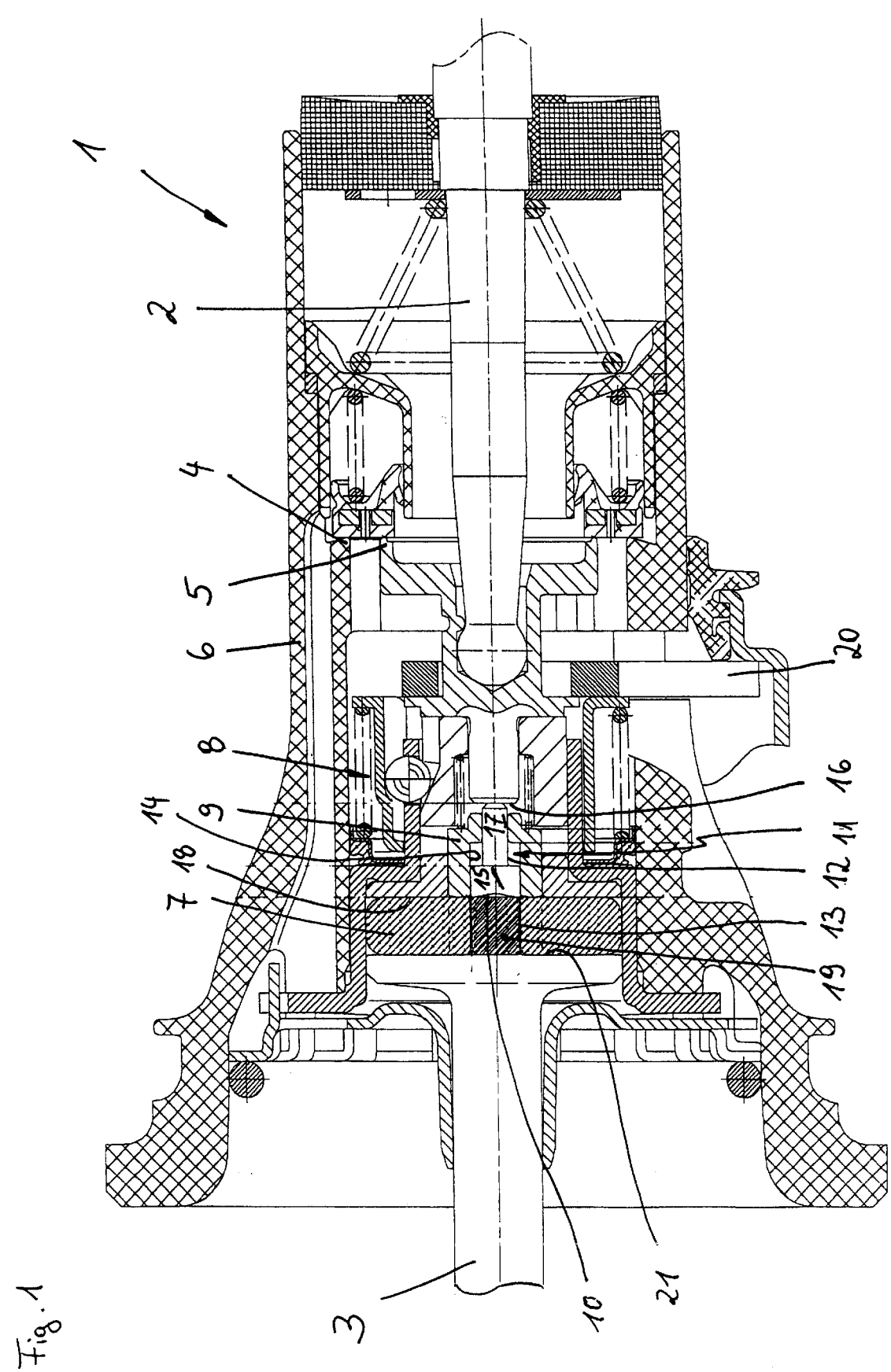
FIG. 1 is a view of a control unit according to an embodiment in a ready position of the brake.

The control unit 1 of a pneumatic brake booster including a reaction force transmission mechanism with a panic stop function, as shown in the Figure, comprises an input member 2 (valve piston), an output member (push rod) 3, two sealing seats 4, 5, a control housing 6, a reaction plate 7 arranged between input member 2 and output member 3, and further coupling means 8 for a pressure member 9, and corresponds in basic parts to the control unit disclosed in FIG. 9 of WO 99/26826 so that the pertinent parts of the description are expressly included in the present application. The activation operation and the release operation for the panic stop function are identical with the functions of the present invention because in each case a relative displacement between input member 2 and control housing 6 is taken into account as a criterion for the triggering operation.

In contrast to the prior-published reaction force transmission mechanism, the reaction plate 7 includes a recess 13 in the area of an abutment surface 10 of a valve piston extension 11 (according to this embodiment a tracer pin 12).

Figure 2:
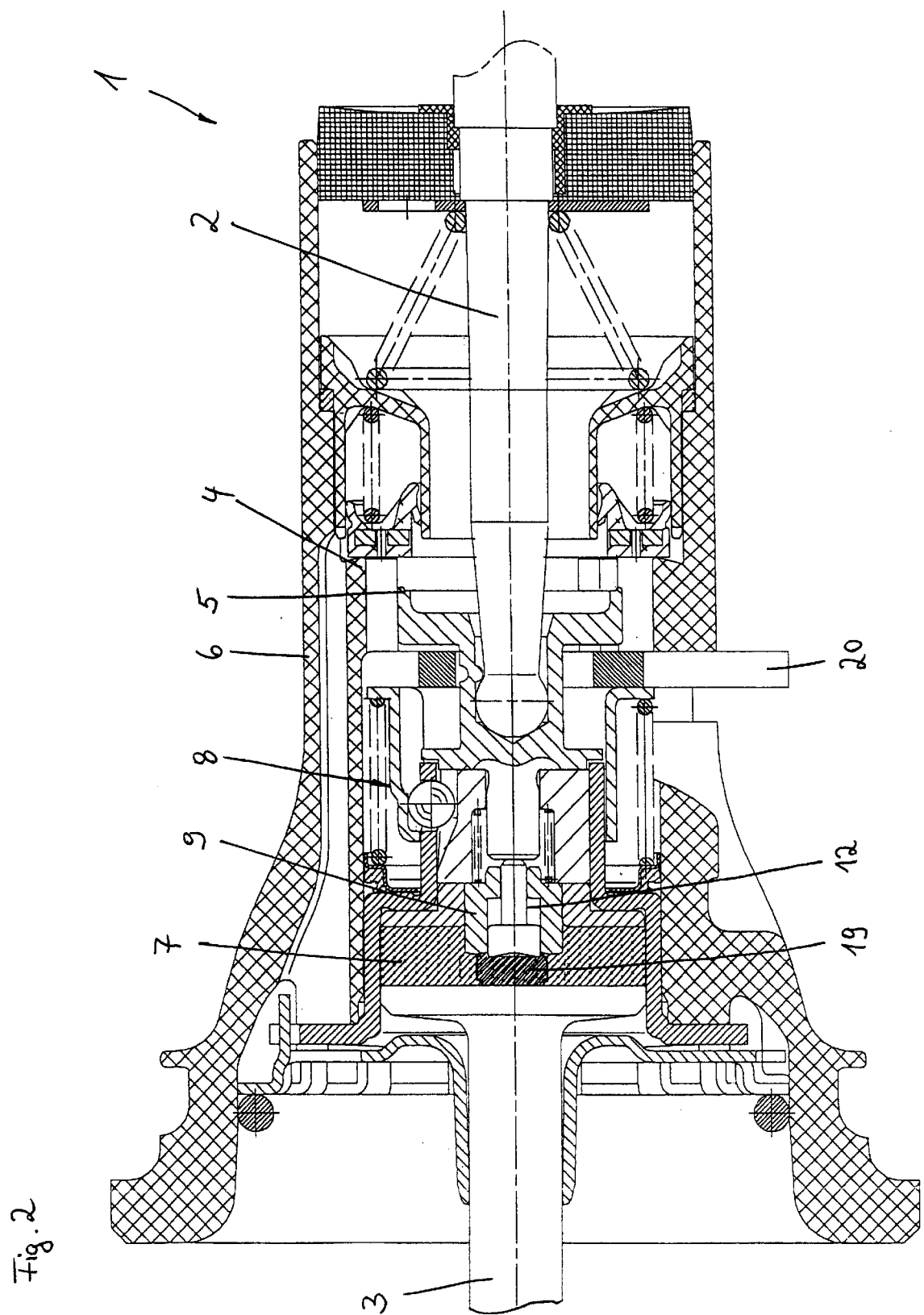
FIG. 2 is a view of the control unit according to FIG. 1 in the brake's fully applied position (panic stop function).

The tracer pin 12 is a component which is manufactured independently of the input member 2 and mounted in a bore 14 of the pressure member 9 so as to be slidable in relation to input member 2 and also to the pressure member 9. With a first end 15, tracer pin 12 is movable into abutment on a frontal end 16 of the valve piston, and with a second end 17 having abutment surface 10 is movable into abutment on the reaction plate 7. With respect to its surface contents, the abutment surface 10 of the tracer pin is smaller than the abutment surface 18 of the pressure member 9. A (small) portion of the reaction force is transmitted onto the input member (valve piston) 2 and, hence, to the driver due to the abutment of the tracer pin 12 on the reaction plate 7, on the one hand, and on the input member 2, on the other hand, which abutment takes place in the emergency braking position (FIG. 2). Consequently, the driver not only senses the reactive effect of spring forces but also of brake reaction forces. More specifically, an actuating feeling is imparted to the vehicle driver which corresponds to the brake effect. Preferably, the diameter of the tracer pin 12 at the first end close to the reaction plate is identical to the diameter of recess 13. An exchangeable insert 19 made of elastic material is disposed in the recess. This measure permits effectively reducing mechanic strains in the interior of the reaction plate 7 and, consequently, increasing the plate's service life. The separation between the radial outside part of the reaction plate 7 and the insert 19 thus takes place in the area of the most intense shearing strains.

It is feasible to manufacture both the insert 19 and the reaction plate 7 from identical material. However, it is advantageous for certain cases of application to make the insert 19 and the outside part 7 of materials having a different elasticity module (or different Shore hardness). This permits adapting the brake booster with respect to the connecting threshold or switch-on threshold for the active emergency braking position.

In a certain way, the Figures illustrate a cycle of actuations by way of instantaneous shots. In a ready position according to FIG. 1, the input member 2 is actuated so that the sealing seat 4 is closed (isolation of the working chamber from the evacuation). Likewise the control valve with the sealing seat 5 which is responsible for the ventilation of the working chamber with atmospheric pressure assumes its closed condition, however, each further displacement of the input member 2 in the actuating direction causes a more or less extensive ventilation. In this condition, input member 2, output member 3, and pressure member 9 are in abutment on the virtually pressureless, non-deformed reaction plate 7. The tracer pin 12 is with its first end 15 in abutment on the frontal end 16 of the input member and with its second end 17 in abutment on the insert 19.

In the activated emergency braking position according to FIG. 2, sealing seat 4 is closed and sealing seat 5 opened, and coupling means 8 take care of fixing the pressure member 9 to the control housing 6, as can be taken in detail from WO99/26826. Further, there is a balance of the input-side and the output-side forces at the reaction plate 7. This is effected by the deformation of the reaction plate 7 shown. It will be noted in addition that the entry of the pressure member 9 and the tracer pin 12 cause a considerable deformation of reaction plate 7 and insert 19. Because the insert 19 is compressed between two walls (output member 3 and tracer pin 12), it will increase in diameter with a reduced length (under the limiting condition of the constancy of volume).

Figure 3:
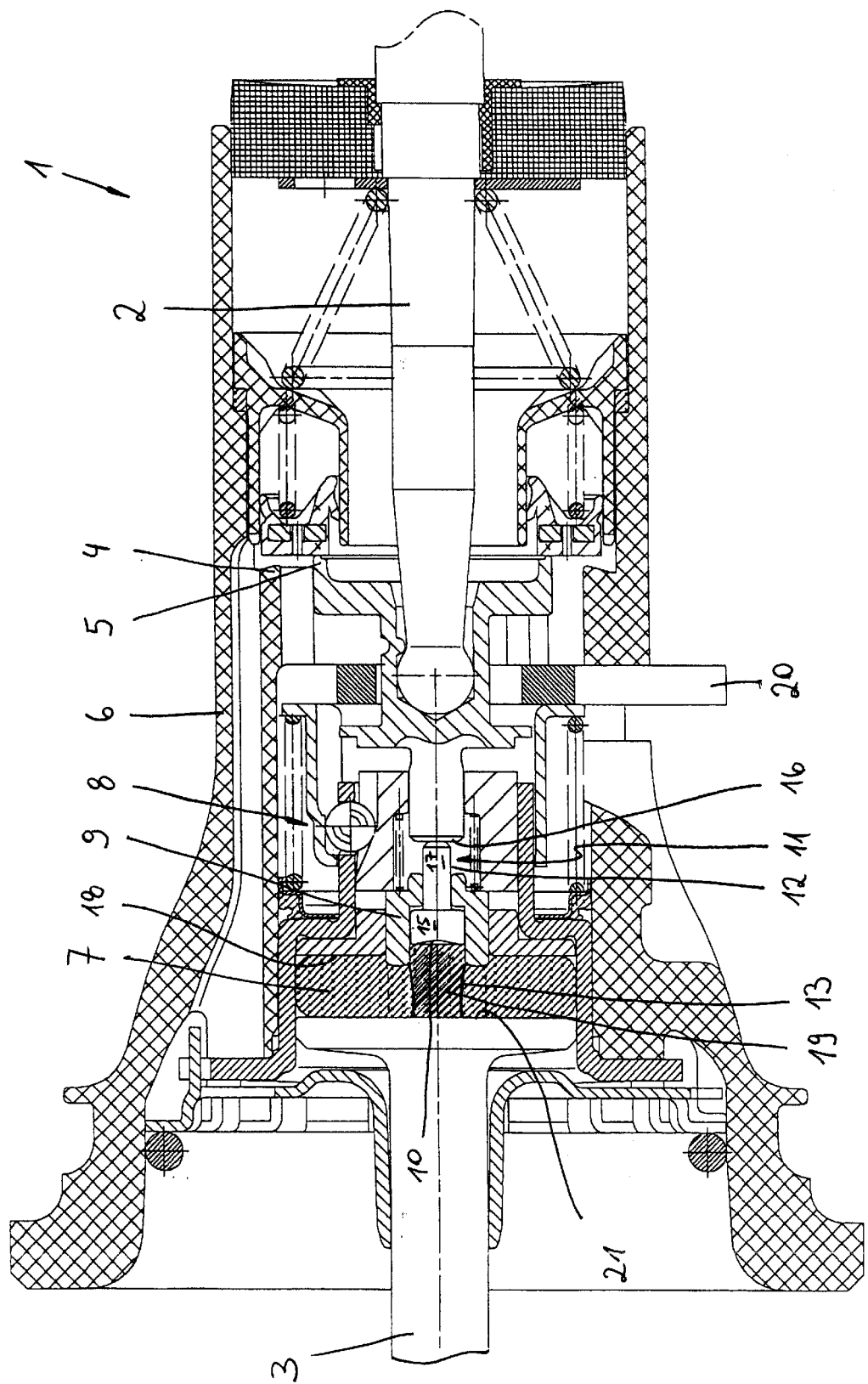
FIG. 3 is a view of the control unit of FIG. 2 in a release position out of the brake's fully applied position.

FIG. 3 illustrates the release process after, starting from the active emergency braking position according to FIG. 2, the input member 2 has been retracted in opposition to the actuating direction. In doing so, the valve seat 4 was opened for evacuation of the working chamber, and valve seat 5 closed. Further, it is important that the coupling means 8 abut on a transverse member 20 which, during the retraction movement, in turn is movable into fixed abutment on a booster housing (not shown). This causes release of the clutch, as may be gathered in more detail from WO99/26826. Due to the retraction movement, on the one hand, and due to the pressure that is transmitted close to the periphery to the insert 19 caused by the reaction plate 7, on the other hand, the insert 19 flows in a longitudinal direction by reducing its diameter, as shown in FIG. 3. Except for barrel-shaped deformations at the periphery, the insert 19 largely adopts its original shape.

Figure 4:
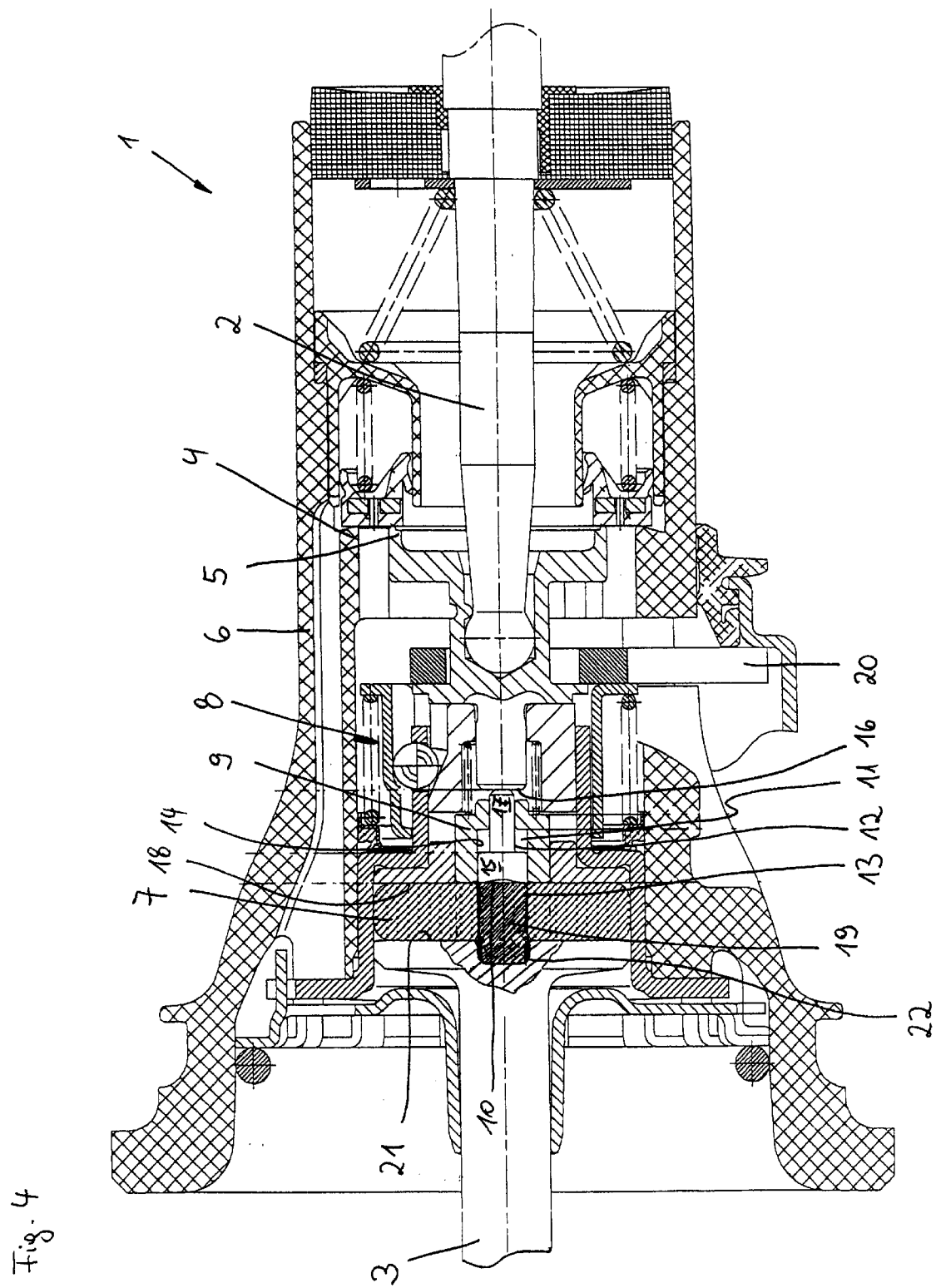
FIG. 4 is a cross-sectional view as in FIG. 1 of another embodiment.

The present invention may be arranged for in another embodiment of the present invention (FIG. 4) that, starting from an abutment surface (21) of the output member (push rod) 3 of the brake booster close to the reaction plate, an axial recess 22 is provided into which the insert 19 is additionally slipped. Consequently, the insert 19 which preferably is of a circular-cylindrical configuration has an axial length which is greater than the thickness of the reaction plate 7 and, in total, has a larger volume than the insert according to FIGS. 1 to 3. A change in shape is thereby allowed to an increased extent.

What is claimed is:

1. Reaction force transmission mechanism for a pneumatic brake booster, wherein the reaction force transmission mechanism is connected between an input member and an output member, wherein a side of said force transmission mechanism connected to the input member is selectively acted upon by a pressure member which is adapted to be fixed to a control housing and, consequently, can be excepted from the transmission of the reaction force to a vehicle driver, comprising:

a reaction plate having a recess, a tracer pin disposed adjacent to an elastic insert, wherein said tracer pin is in operative communication with said input member, wherein the output member includes an axial recess for accommodating the elastic insert, and wherein the elastic insert has an axial length greater than a thickness of the reaction plate.

2. Reaction force transmission mechanism as claimed in claim 1, wherein the tracer pin is slideably captured by said pressure member, wherein said tracer pin is adapted to bear with a first end against a frontal end of the input member and with a second end against a surface of the elastic insert.

3. Reaction force transmission mechanism as claimed in claim 2, wherein the pressure member contacts a surface of said elastic insert, and wherein the tracer pin includes an abutment surface in operative contact with the reaction plate, wherein the abutment surface area of the tracer pin is smaller than an abutment surface area between the pressure member and the reaction plate.

4. Reaction force transmission mechanism as claimed in claim 2, wherein the recess in the reaction plate has a diameter which generally corresponds to a diameter of the tracer pin in the area of its abutment against the reaction plate.

5. Reaction force transmission mechanism as claimed in claim 1, wherein the elastic insert and the reaction plate are made of materials with different elasticity modules or different Shore hardnesses.

6. Reaction force transmission mechanism as claimed in claim 1, wherein the elastic insert has a cylindrical shape or a barrel shape.

7. Reaction force transmission mechanism as claimed in claim 1, wherein the elastic insert is separable from the reaction plate.

* * * * *